(12) United States Patent
Cahill

(10) Patent No.: US 8,214,121 B2
(45) Date of Patent: Jul. 3, 2012

(54) BRAKE CONTROL INTERLOCK LOGIC

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 643 days.

(21) Appl. No.: 12/396,676

(22) Filed: Mar. 3, 2009

(65) Prior Publication Data

US 2009/0240412 A1    Sep. 24, 2009

Related U.S. Application Data

(60) Provisional application No. 61/037,865, filed on Mar. 19, 2008.

(51) Int. Cl.
*G06F 7/70* (2006.01)
(52) U.S. Cl. ......................................................... 701/70
(58) Field of Classification Search .................... 701/69, 701/70, 78
See application file for complete search history.

(56) References Cited

U.S. PATENT DOCUMENTS

| 5,954,407 | A | 9/1999 | Schramm et al. |
| 6,157,887 | A | 12/2000 | Zittlau |
| 2005/0288843 | A1 * | 12/2005 | Lindqvist ........................ 701/70 |

FOREIGN PATENT DOCUMENTS

WO    2005110829    11/2005

OTHER PUBLICATIONS

GB; Examination Report dated Aug. 1, 2011 in Application No. GB0904556.8.

* cited by examiner

*Primary Examiner* — Kim T Nguyen
(74) *Attorney, Agent, or Firm* — Snell & Wilmer L.L.P.

(57) ABSTRACT

A brake control circuit for determining if a brake command from a brake pedal is valid is provided. The brake control circuit includes at least two independent channels configured to receive data indicative of brake pedal deflection for the brake pedal, and logic circuitry operatively coupled to the at least two independent channels. The logic circuitry is configured to generate a valid brake flag when the respective channels receive data that are within a predetermined range of one another, and to generate an invalid brake flag when the respective channels receive data that are not within a predetermined range of one another.

4 Claims, 5 Drawing Sheets

BRAKE CONTROL INTERLOCK LOGIC

RELATED APPLICATION DATA

This application claims priority of U.S. Provisional Application No. 61/037,865 filed on Mar. 19, 2008, which is incorporated herein by reference in its entirety.

FIELD OF THE INVENTION

The present invention relates generally to brakes and, more particularly, to brake control logic that controls the delivery of hydraulic or electric power in a braking system of a vehicle, such as an aircraft. More particularly, the invention relates to brake logic that prevents untimely, uncommanded actuation of the brakes.

BACKGROUND OF THE INVENTION

In hydraulic braking systems for aircraft, the delivery of hydraulic power is controlled via a hydraulic shutoff valve. More particularly, the shutoff valve includes an inlet for receiving pressurized hydraulic fluid, and an outlet for delivering the pressurized hydraulic fluid. The outlet is typically coupled to control valves (e.g., servo valves) that control the actual pressure applied to a brake assembly.

If the shutoff valve is open, then hydraulic pressure is provided to the respective servo valves, and braking operation is enabled. If the shutoff valve is closed, however, the pressurized hydraulic fluid cannot reach the servo valves. Without hydraulic pressure at the servo valves, braking is inhibited.

In electric brake systems, electric power is provided to an actuator via an electromechanical actuator controller (EMAC). The EMAC delivers the electric current that is used by the brake actuator (e.g., a motor), which in turn provides a mechanical force on the brake disk stack.

If the EMAC is active (e.g., enabled and electrically coupled to the actuator), then electrical power can be provided to the actuator. Conversely, if the EMAC is not enabled, or not electrically coupled to the actuator, then electrical power cannot be delivered to the actuator and, thus braking is not possible.

SUMMARY OF THE INVENTION

A system, apparatus and method in accordance with the present invention provides control logic for operating a brake control device, such as a hydraulic shutoff valve or an EMAC of a braking system. More particularly, a determination is made whether signals corresponding to brake pedal deflection are valid or invalid. If the signals are determined to be valid and correspond to a braking request, then the brake control device is enabled and braking operation may occur. If the signals are determined to be invalid, however, then the brake control device is disabled, thereby cutting off the flow of power and inhibiting braking operation.

The validity of the signals can be determined by comparing two independent signals that correspond to pedal deflection (e.g., a first channel providing a first signal corresponding to pedal deflection, and a second channel providing a second signal corresponding to pedal deflection). If the two signals are within a predetermined range of one another, then the signals are said to be valid, and if they are not within the predetermined range of one another, then the signals are said to be invalid. The system, apparatus and method in accordance with the invention can prevent untimely, uncommanded actuation of the brakes.

According to one aspect of the invention, a brake control circuit for determining if a brake command from a brake pedal is valid includes at least two independent channels configured to receive data indicative of brake pedal deflection for the brake pedal, and logic circuitry operatively coupled to the at least two independent channels. The logic circuitry is configured to generate a valid brake flag when the respective channels receive data that are within a predetermined range of one another, and to generate an invalid brake flag when the respective channels receive data that are not within a predetermined range of one another.

The logic circuitry can include a summing junction operatively coupled to the at least two independent channels, wherein the summing junction is configured to calculate an absolute difference between data received by the at least two independent channels.

The logic circuitry can also include a first comparator operatively coupled to the summing junction, wherein the first comparator is configured to compare the absolute difference to a predetermined value, and to provide a result of the comparison. A second comparator can be operatively coupled to one of the first or second channels, and the second comparator can be configured to compare data received by the first or second channel to a predetermined pedal deflection, and to provide a result of the comparison. The outputs of the first and second comparator can be provided to an AND gate, wherein the output of the AND gate corresponds to the brake flag (e.g., corresponds to a valid or invalid flag).

The logic also can include scaling circuitry configured to convert raw data received by the at least two independent channels into data compatible with digital circuits. Additionally, the at least two channels can be electrically isolated from one another.

According to another aspect of the invention a brake system for controlling braking operation of a vehicle includes the brake circuitry described herein, a brake pedal, and at least two sensors. Each sensor is operatively coupled to the brake pedal and to a respective one of the at least two independent channels, wherein the sensors are configured to provide data indicative of deflection of the brake pedal to the respective channel. The at least two sensors can be independent of one another, and can be linear displacement sensors or rotary displacement sensors.

The brake system can further include a power delivery device operatively coupled to the brake circuit, and at least one brake actuator operatively coupled to the power delivery device. When the brake flag provided by the brake circuit is valid, the power delivery device is configured to provide power to the at least one brake actuator, and when the brake flag invalid, the power delivery device is configured to inhibit power to the at least one brake actuator.

The power delivery device can be a hydraulic shut-off valve or an electro-mechanical actuator (EMAC). If the power delivery device is an EMAC, then the system can further include an electrically operated contactor coupled between the EMAC and the at least one brake actuator, the contactor configured to couple or decouple electrical power from the EMAC to the at least one brake actuator based on the brake flag.

According to another aspect of the invention, a method for determining if a brake command is valid includes deriving at least two independent signals indicative of brake pedal deflection, and concluding that the brake command is valid when the at least two independent signals are within a predetermined range of one another. Further, when the at least two independent signals are within a predetermined range of one another, the brake command is maintained as invalid until the at least two independent signals are greater than a predetermined value.

The method can further include enabling a power delivery device when the brake command is valid, and disabling the power deliver device when the brake command is invalid. Preferably, the method is implemented in hardware logic, although it may be implemented via software executed by a microprocessor-based controller.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

DETAILED DESCRIPTION

The principles of the invention will now be described with reference to the drawings. Because the invention was conceived and developed for use in an aircraft braking system, it will be herein described chiefly in this context. However, the principles of the invention in their broader aspects can be adapted to other types of braking systems.

In braking a vehicle, a brake command is often provided via a brake pedal. More particularly, a requested braking force for a vehicle braking system can be proportional to a deflection of the brake pedal (e.g., increased deflection provides increased braking command to the braking system). The brake command is provided to a brake controller, which controls a braking pressure (and force) applied to the brakes so as to correspond to the brake command.

As will be appreciated, it is desirable to apply brakes only when commanded to do so. To this end, the brake command generated by the brake pedal should be generated only when a valid braking request is made.

A system, apparatus and method in accordance with the present invention enables the determination of a valid or invalid brake pedal command. If the command is valid, a brake power delivery device is enabled so as to permit braking, and if the command is invalid, the brake power delivery device is disabled, thereby inhibiting braking.

In accordance with the present invention, each brake pedal may be coupled to two or more independent deflection sensors that detect a deflection of the brake pedal. A valid command occurs when brake pedal deflection exceeds a predetermined deflection (e.g., a dead band, which typically is set from 5-20 percent of maximum pedal deflection) and the two or more deflection sensors are in agreement with each other (e.g., within a predetermined range of one another).

Figure 1:
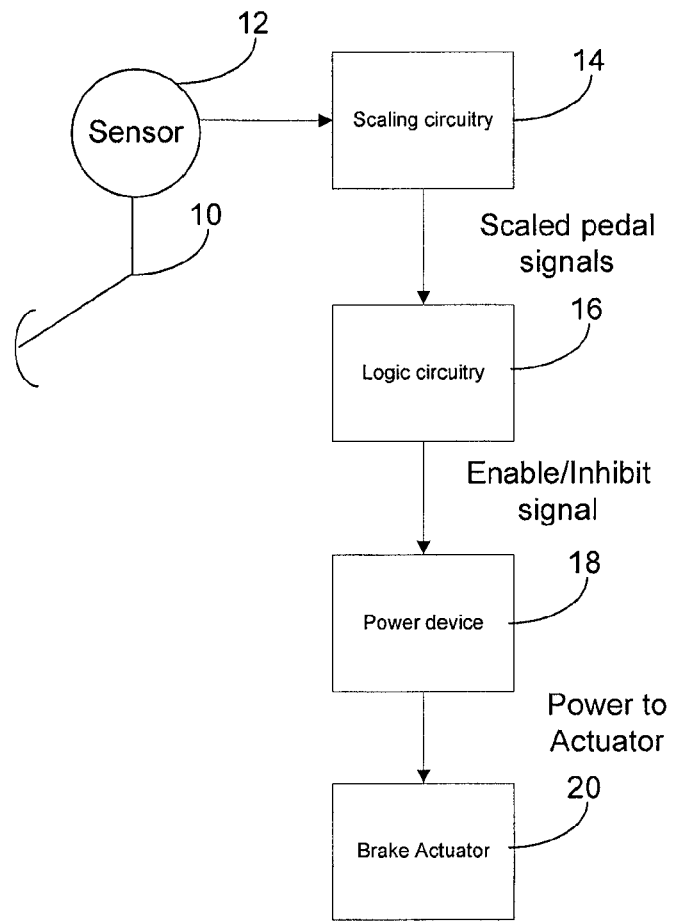
FIG. 1 is a block diagram illustrating an exemplary signal flow for a brake system in accordance with the invention.

Referring to FIG. 1, there is shown an exemplary block diagram illustrating the signal flow for a brake system in accordance with the invention. The brake system includes one or more brake pedals 10 each operatively coupled to a corresponding sensor 12. As discussed in more detail below, the sensor 12 comprises at least two independent sensing devices, each of which detects deflection of the corresponding pedal 10 and generates a signal indicative of the pedal deflection. The signal from each sensing device of the sensor 12 is provided to scaling circuitry 14, which converts the raw data generated by the sensing device into meaningful data that can be used by other digital or analog circuitry of the system. For example, the scaling circuitry can scale an AC sinusoidal signal provided by each sensing device of the sensor 12 into a 0-5V DC signal, which is a typical voltage level used by analog-to-digital converters (ADCs).

The scaled brake pedal deflection signal from each sensing device then is provided to logic circuitry 16, which analyzes the respective signals to determine if the signals correspond to a valid braking request (e.g., the signals are in agreement with one another and they are not within the dead band range). Based on whether or not the analysis, appropriate action is taken (e.g., an enable or inhibit command is issued, which can be used to enable or inhibit braking as discussed in more detail below).

The output of the logic circuitry 16 then is provided to a power delivery device 18, such as a hydraulic shut off valve or an electromechanical actuator controller (EMAC). Based on the status of the signal provided by the logic circuitry 16, the power delivery device 18 is enabled or inhibited. In the enabled state, the power delivery device 18 can provide power to actuator 20 (e.g. a hydraulic cylinder via a servo valve, or an electric motor), thereby enabling brake operation. While in the inhibited state, the power delivery device 18 cannot provide power to the actuator 20, thereby inhibiting brake operation.

Figure 2A:
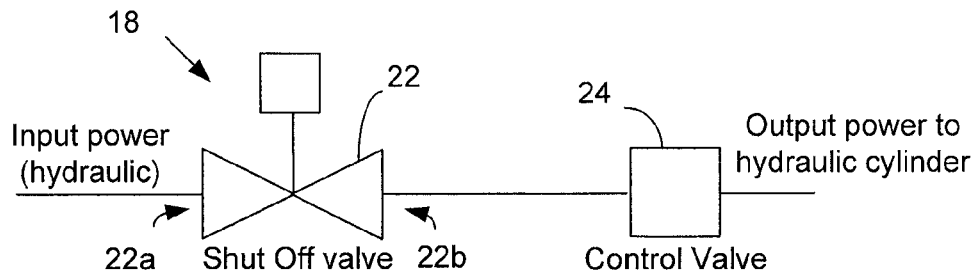
FIG. 2A is a block diagram illustrating a first exemplary power delivery device that can be used in system in accordance with the present invention.
Figure 2B:
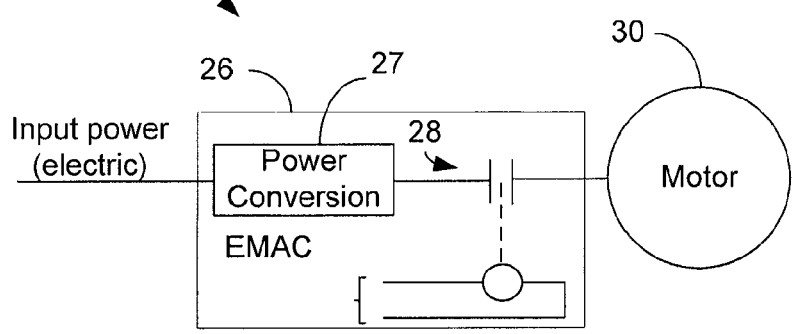
FIG. 2B is a block diagram illustrating a second exemplary power delivery device that can be used in system in accordance with the present invention.

With further reference to FIGS. 2A and 2B, there is shown two exemplary power delivery devices. FIG. 2A illustrates a power delivery device embodied as a hydraulic shut off valve 22, while FIG. 2B illustrates a power delivery device embodied as an EMAC 26 and output contactor 28.

More specifically, FIG. 2A illustrates a hydraulic shutoff valve 22 having an input port 22a coupled to a hydraulic power source (not shown), and an output port 22b coupled to one or more control valves 24 (e.g., servo valves), which in turn are coupled to hydraulic cylinders (not shown). The shut off valve 22 can be commanded into an open state (inhibit state), wherein the flow of hydraulic power from the input port 22a is blocked from the output port 22b, and into a closed state (enabled state), wherein the flow of hydraulic power from the input port 22a is provided to the output port 22b. The state of the shut off valve 22 (i.e., inhibit or enable) can be controlled via an electric signal as is conventional. More particularly, the shut off valve can include, for example, one or more electrical solenoids (not shown) that are operative to receive the command signal and based thereon, switch the state of the shutoff valve 22 (e.g., from inhibit to enable and vice-versa). When the shut off valve 22 is in the inhibit state, the control valves 24 do not receive hydraulic power and, thus, they cannot communicate the hydraulic power to the hydraulic cylinder.

FIG. 2B illustrates an EMAC 26 that includes an output contactor 28. The EMAC 26 receives electrical power from a power source (not shown) and, via power conversion circuitry 27, converts the power to a form suitable controlling the actuator, such as motor 30. The EMAC also can include an output contactor 28, wherein the output contactor 28 is electrically coupled between the power conversion circuitry 27 and the motor 30. More particularly, when the output contactor 28 is in the closed state, power provided by the power conversion circuitry 27 is electrically coupled to the motor 30, thereby enabling braking. When the output contactor is in the open state, then the motor is electrically isolated from the power conversion circuitry 27 and, thus, braking is inhibited. While the output contactor 28 is shown as being part of the EMAC 26, it should be appreciated that the contactor 28 can be separate from the EMAC.

Figure 3A:
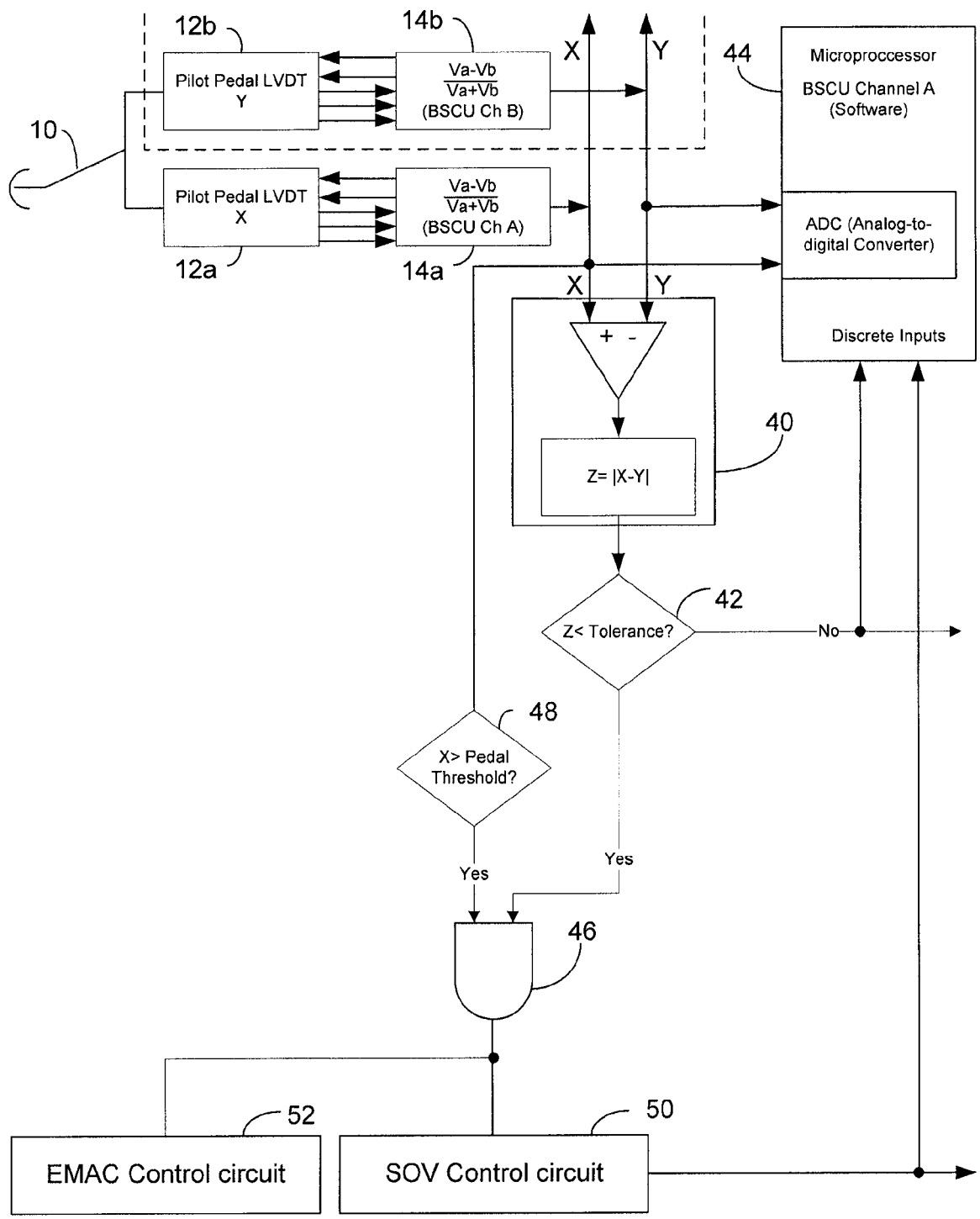
FIG. 3A is a schematic diagram illustrating exemplary logic for enabling or disabling the delivery of hydraulic or electric power in a braking system in accordance with a first embodiment of the invention.

Moving now to FIG. 3A, aspects of the invention will be described in more detail. FIG. 3A illustrates exemplary logic for determining if a braking command is valid or invalid. Although only a pilot left-hand (LH) brake pedal and associated logic are shown, similar logic is provided for a pilot right-hand (RH) brake pedal, and a co-pilot LH and RH brake pedals. Further, each pedal circuit includes two independent logic circuits (channel A and channel B). Channel A performs "X" signal conditioning, and channel B performs "Y" signal conditioning. Channel B is only partially shown in FIG. 3A. It is noted, however, that the configuration of channel B is the same as channel A, except dead band functionality is based on the "Y" signal (as opposed to the "X" signal)

The pilot LH brake pedal 10 is coupled to "X" and "Y" linear displacement sensors, such as LVDT's (linear variable differential transformer) 12a and 12b, such that deflection of the pedal causes a corresponding deflection of a core or armature of each LVDT. As is well known, an LVDT is a reliable and accurate sensing device that converts linear position or motion to a proportional electrical output. The basic LVDT includes three elements: 1) a primary winding; 2) two identical secondary windings; and 3) a movable magnetic armature or "core".

The primary winding can be excited with an AC supply, which generates a magnetic field. When the core is placed in the central or "null" position, equal voltages are induced in both of the secondaries. The secondaries can be wired series opposed so that their combined output represents the difference in the voltage induced in them, which in this case is zero. As the core is moved left or right, the difference in induced voltages produces an output that is linearly proportional in magnitude to the displacement of the core.

Although an LVDT is shown in the drawings and described herein, other sensors may be used in place of the LVDT without departing from the scope of the invention. Examples of such sensors include rotary devices such as RVDTs (rotary variable differential transformer), potentiometers, rotary position sensors (e.g., resolvers) or the like. Such sensors can be operatively coupled to the brake pedal so as to rotate with pedal deflection. Due to such rotation, a signal provided by the respective sensor provides data indicative of pedal deflection (e.g., based on a known relationship between pedal deflection and rotation of the sensor input shaft, an indication of pedal deflection can be ascertained).

Coupled to each LVDT 12a and 12b are "X" and "Y" scale and driver circuits 14a and 14b, respectively. The scale and driver circuits 14a and 14b provide the excitation voltage to the respective LVDTs, and convert the LVDT output voltage to signals that are typically used by ADCs. For example, the scale and driver circuits 14a and 14b may provide each LVDT 12a and 12b with an AC sine wave for excitation, which in turn produces an AC output signal from the LVDT based on the linear position of the core. The scale and driver circuits 14a and 14b, which receive this AC signal from the respective LVDTs, convert the AC signal to a scaled DC signal (e.g., a 0-5 VDC signal) for use by logic circuitry, as discussed below. The outputs of the scale and driver circuits 14a and 14b are referred to herein as the channel A brake deflection signal (the "X" signal) and channel B brake deflection signal (the "Y" signal), respectively.

As will be appreciated, the type of circuitry used in the scale and driver circuits 14a and 14b is dependent on the particular sensor used to detect brake pedal deflection. For example, an RVDT, like the LVDT, can use scale and driver circuits substantially the same as those shown in FIG. 3A (although scaling may be different). If, for example, the sensor utilized to determine pedal deflection is a potentiometer, then instead the scale and driver signal providing an AC excitation signal, it may provide a DC signal (e.g., a 0-5V DC signal). In this instance, circuitry related to generating or providing AC excitation signals can be removed from the scale and driver circuit, and in its place circuitry can be provided for generating the DC signal. The scaling function can remain, but be reconfigured for use with the DC signal provide from the potentiometer. A sensor embodied as a resolver would require the AC excitation signal (similar to that used with the LVDT), but different scaling circuitry would be required to convert the resolver data into signals that are typically used by ADCs. Circuitry for providing excitation signals to the sensors and converting the data from the sensors is well known in the art and thus not described herein.

It is noted that in the example of FIG. 3A channels A and B are isolated from one another as indicated by the dashed line (channel A is separated from channel B by the dashed line). The isolation may be in the form of opto-isolators or the like that electrically isolate channel A from channel B. Preferably, channels A and B are formed on separate logic assemblies.

Once scaled, the channel A and B brake pedal deflection signals are output by the scale and driver circuits 14a and 14b and provided to a summing junction 40. The summing junction 40 subtracts the channel B signal (the "Y" signal) from the channel A signal (the "X" signal), and then performs an absolute value function to ensure a non-negative result.

The output of the summing junction 40 then is provided to an input of a first comparator 42, which compares the output of the summing junction 40 to a predetermined tolerance value. Preferably, the tolerance value is a fixed value, and may be expressed as a percentage of maximum pedal deflection (e.g., 5 percent of maximum deflection). As described below, the first comparator 42 operates to detect when channel A and channel B are in disagreement, and can be used to identify a problem with one or both of the channels. The first comparator 42 also includes a "NO" output and a "YES" output. The NO output is coupled to a digital input of a brake system control unit (BSCU) 44, while the "YES" output is coupled to a first input of AND gate 46.

In operation, when the difference between the channel A and channel B signals is less than the tolerance value, the "NO" output of the first comparator 42 is false (low or logic 0) and the "YES" output of the first comparator 42 is true (high or logic 1). When the difference between channel A and channel B signals is greater than or equal to the tolerance value, the "NO" output of the first comparator 42 is true (high or logic 1) and the "YES" output of the first comparator 42 is false (low or logic 0).

For example, assume that maximum pedal deflection results in both channels A and B outputting a value of 1000 counts, and the tolerance value is preset to five percent of maximum (i.e. 50 counts in the present example). Further assume that at about fifty percent pedal deflection the scale and driver circuit 14a outputs 500 counts for channel B and the scale and driver circuit 14b outputs 525 counts for channel A. Then the summing junction 40 will output a value of 25 counts (525-500), which is less than the preset tolerance value of 50 counts. Thus, the YES output of the first comparator 42 will be true and the NO output of the first comparator 42 will be false. Now if the scale and driver circuit 14b outputs 560 counts for channel A (assuming pedal deflection is unchanged), the summing junction 40 will output 60 counts (560-500), which is greater than the preset tolerance of 50 counts. As a result, the NO output of the first comparator 42 will be true and the YES output of the first comparator 42 will be false.

The channel A signal is also provided to an input of a second comparator 48, which compares the channel A data to a preset threshold value. As described in more detail below, the second comparator 48 provides a "dead band" function, wherein the braking system will be disabled until the brake pedal has been sufficiently displaced. The preset threshold value may be set as a percentage of maximum brake pedal displaced (e.g., 5-20 percent of maximum pedal deflection). The second comparator 48 also includes a "NO" output, and a "YES" output. The "NO" output is left uncoupled, while the "YES" output is coupled to a second input of AND gate 46.

In operation, when channel A signal is less than or equal to the threshold value, the "YES" output of the second comparator 48 is false (low or logic 0), and when the channel A signal is greater than the threshold value, the "YES" output of the second comparator 48 is true (high or logic 1). For example, if the threshold value is set to five percent of maximum pedal deflection (i.e., 50 counts when maximum pedal deflection is 1000 counts), then the YES output of the second comparator 48 will be true when the channel A signal is greater than 50 counts, and false when the channel A signal is less than or equal to 50 counts.

As noted above, the AND gate 46 receives the "YES" output from the first comparator 42 and the "YES" output from the second comparator 48. An output of the AND gate 46 is coupled to an enable input of the of a brake power device, such as shutoff valve control circuit 50 or EMAC control circuit 52, wherein when the AND gate output signal is true (high or logic 1) the power device is enabled. For example, when the AND gate output is true, the shutoff valve control circuit 50 commands the shutoff valve 22 to open so as to enable the flow of fluid power to control valves 24, or the EMAC control circuit 52 commands the contactor 28 to close so as to electrically couple power circuitry 27 to the motor 30. If the AND gate output signal is false (low or logic 0), the power device is disabled. For example, when the AND gate output is false, the shutoff valve control circuit 50 commands the shutoff valve 22 to close so as to inhibit the flow of fluid power to control valves 24, or the EMAC control circuit 52 commands the contactor 28 to open so as to decouple the power circuitry 27 from the motor 30. A status output (e.g., open, closed, coupled or uncoupled) of the power device is provided to the BSCU 44.

Both the shutoff valve control circuit 50 and the EMAC control circuit 52 may include the necessary logic circuits to interface with the AND gate 46, as well as power driver circuits for driving solenoids, contactors, or the like. Further, the shutoff control circuit 50 may be mounted on the shutoff valve 22 or located elsewhere. Similarly, the EMAC control circuit 52 may be located on or in the EMAC 26, or it may be located elsewhere.

In normal operation, the pilot may depress the LH brake pedal 10, which actuates the core of each LVDT 12a and 12b. The resulting motion of the respective cores produces corresponding channel A and channel B signals at the output of the scale and driver circuits 14a and 14b. If operating properly, both channel A and channel B signals should be approximately the same (e.g., within 1-2 percent of one another). This results in a very small output from the summing junction 40 (e.g., around 0). When the first comparator 42 compares this small value to the tolerance value (which is set to say 5 percent of maximum pedal deflection), the "YES" output is set true (high or logic 1) and the "NO" output is false (low or logic 0). The AND gate 46, receiving a logic 1 on its first input, then produces an output corresponding to the value at its second input.

The second input of the AND gate 46 corresponds to the dead band threshold as determined by the second comparator 42. As noted above, the YES output of the second comparator 48 (and thus the second input of the AND gate) will remain false until sufficient pedal deflection has been detected. Thus, even though pedal deflection has been initiated, the output of the AND gate 46 will remain false (and thus the power device will be disabled) until the pedal deflection exceeds the dead band threshold as determined by the second comparator 48. Once this threshold has been exceeded, the second comparator will toggle the "YES" output (and thus the second input of the AND gate 46) to true, and the shutoff control circuit 50 (or EMAC control circuit 52) will command the corresponding power device into the enabled state (e.g., shutoff valve 22 to open, thereby enabling the flow of fluid power, or contact 28 closed, thereby enabling the flow of electrical power).

If operating abnormally, then as the brake pedal 10 is depressed, there will be a difference between the channel A signal and the channel B signal (e.g., the signals may be offset from one another or they may not track one another). This difference in signals results in a relatively large error at the output of the summing junction 40, which in turn is interpreted by the first comparator 42 as exceeding the tolerance level. As a result, the "NO" output is set true, and the "YES" output (and thus the first input of the AND gate 46) is set false. Now, since the first input of the AND gate 46 is false, the output of the AND gate 46 will remain false regardless of the state of the second input. This results in the shutoff valve control circuit 50 (or EMAC control circuit 52) commanding the corresponding power device into the disabled state. For example, the shutoff valve 22 can be closed so as to inhibit the flow of hydraulic power to the control valves 24. In the case of electrically operated brakes, the output of the EMAC can be decoupled from the actuator by opening contactor 28. In both cases, power is removed from the power device. Further, an output or message (e.g., a warning light, message on a display, etc.) can be provided to the pilot and/or co-pilot to warn them of the discrepancy.

During the above-described operation, it is preferable that all of the logic is performed in hardware, and the BSCU 44 only performs a monitoring function (e.g., via analog and digital I/O coupled to the logic circuit). It will be appreciated, however, that the logic illustrated in FIG. 3A may be implemented completely or partially within the BSCU 44 via software code, for example.

While the interlock logic has been described with respect to two sensors associated with each brake pedal, there may be more than two sensors per pedal. In such situations, sensor voting may be implemented to determine which sensor data is valid. For example, in a system where three sensors are coupled to a brake pedal and pressure is applied to the pedal, a first and second sensor may be in agreement with each other (e.g., their data is within a predetermined tolerance of one another) while the third sensor may not be in agreement (e.g., the third sensor is faulty and thus the data from the third sensor differs from the data of the other sensors by more than the tolerance threshold). In this situation, since the first and second sensors are in agreement, the data from these two sensors is assumed to be valid, while the data from the third sensor is assumed to be invalid. The interlock logic may operate based on the data from the first and second sensors, while discarding (or ignoring) the data from the third sensor (the two sensors in agreement "out vote" the one sensor that is not in agreement).

Figure 3B:
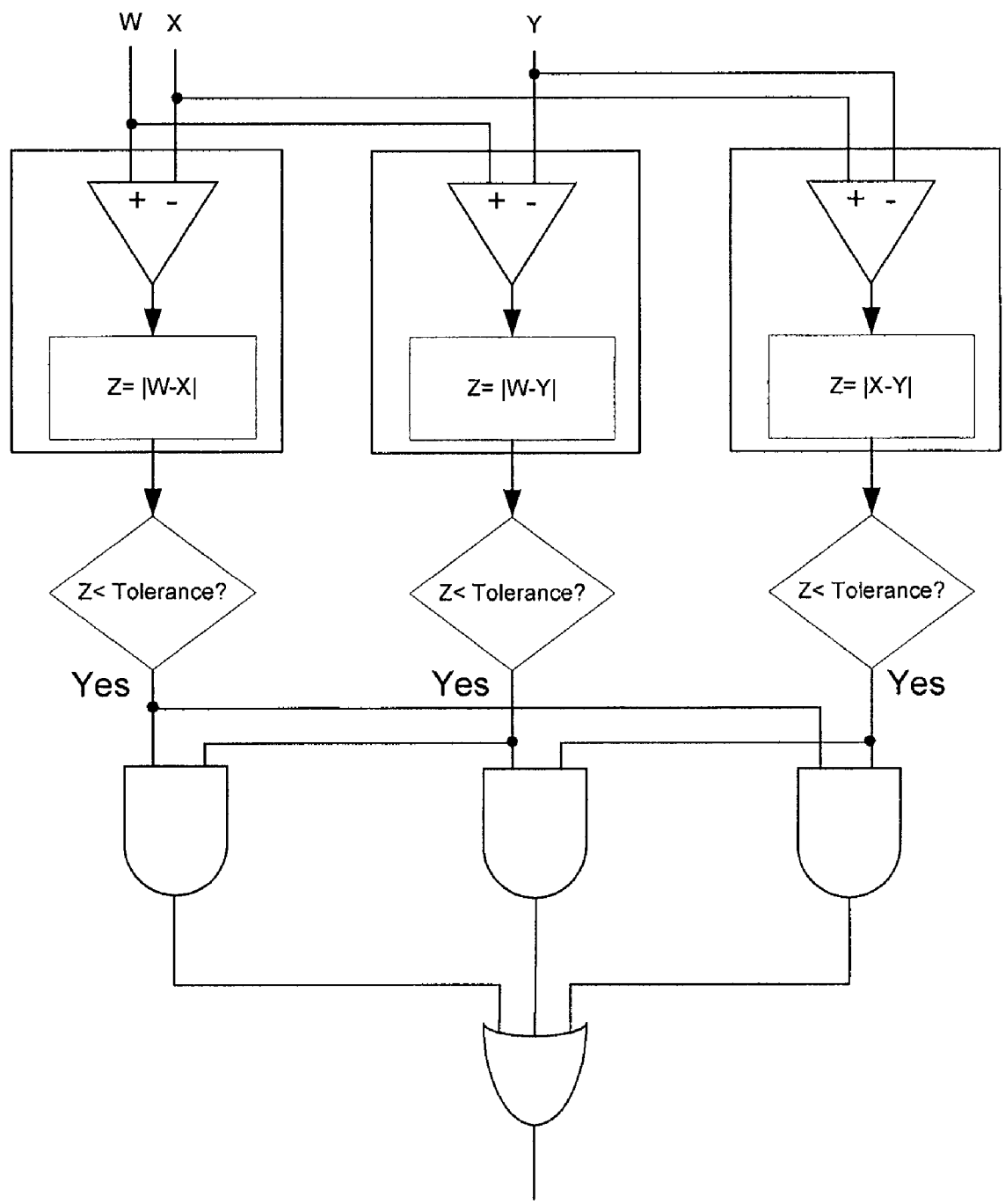
FIG. 3B is a schematic diagram illustrating sensor voting in accordance with an embodiment of the invention.

Such sensor voting may be implemented, for example, by comparing the data provided by the first and second sensor, the first and third sensor, and the second and third sensor (e.g., comparing the sensor data via individual summing junctions 40 and comparators 42). The result of each comparison then can be provided to three different AND gates, wherein the inputs of the first AND gate is the comparison result of the first and second sensors and the comparison result of the first and third sensors. The inputs of the second AND gate can be the comparison result of the first and third sensors, and the comparison result of the second and third sensors, while the inputs of the third AND gate can be the comparison result of the first and second sensors and the comparison result of the second and third sensors. The output of the three AND gates then can be provide to an OR gate, wherein the output of the OR gate corresponds to at least two sensors being in agreement. This output then may be provided, for example, to the input of AND gate 46 of FIG. 3A (e.g., in place of the output from comparator 42). An exemplary circuit that implements the above functionality is shown in FIG. 3B.

Figure 4A:
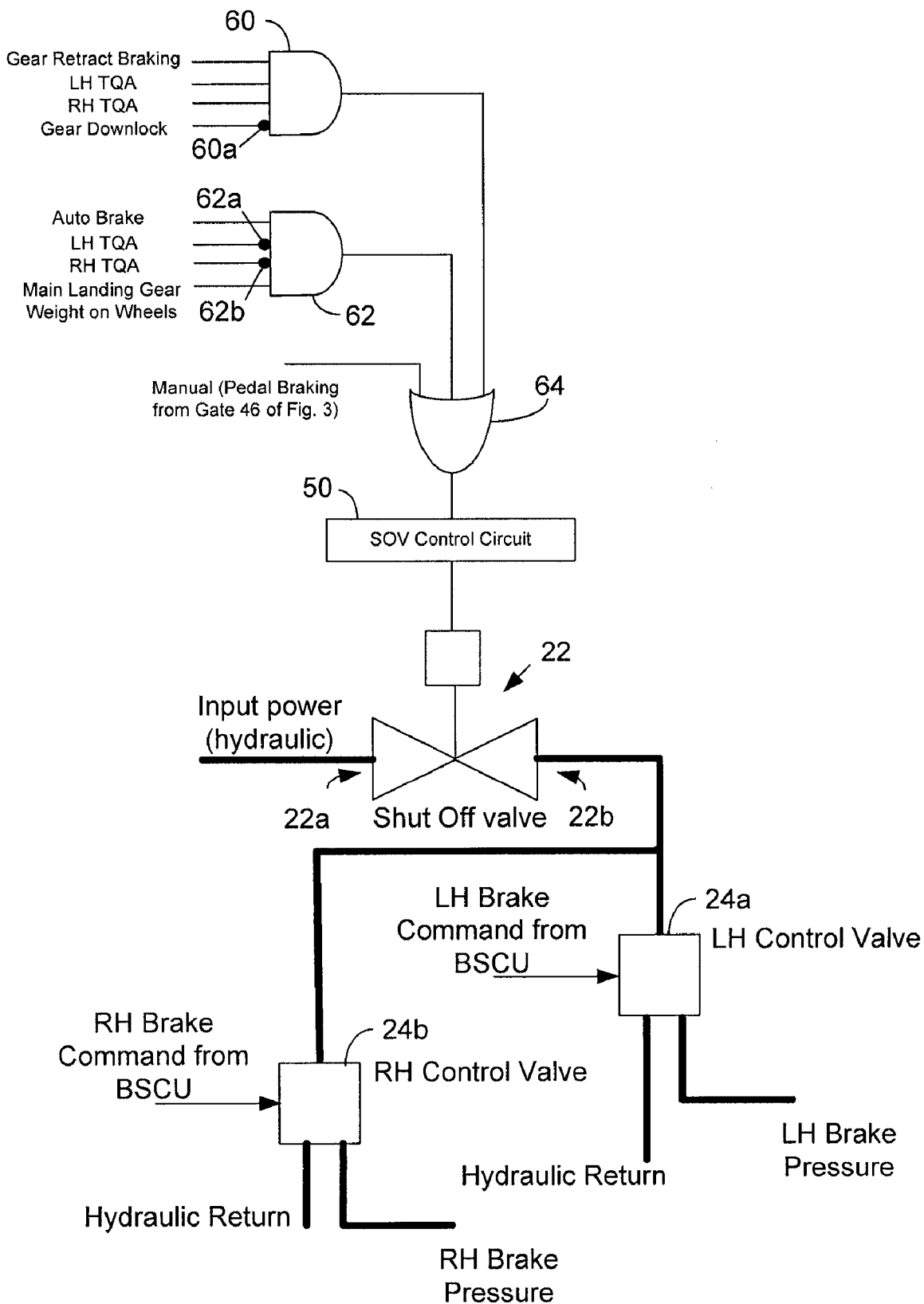
FIG. 4A is a schematic diagram illustrating exemplary logic for enabling or disabling the delivery of hydraulic braking system in accordance with another embodiment of the invention.

With further reference to FIG. 4A, there is shown exemplary brake control logic that may be used in conjunction with the logic of FIGS. 3A (and 3B). More particularly, the circuit of FIG. 4A incorporates the braking logic of FIG. 3A in combination with gear retract braking and autobraking functionality in a hydraulic braking system.

Gear retract braking is an automatic function in which after takeoff (e.g., while the landing gear are being retracted) the brakes are applied so as to stop or slow the wheels. An output of AND gate 60 provides a signal indicative of a gear retract braking command (e.g., a false output disables braking and a true output enables braking).

Autobraking is a braking function in which a pilot may request a preset deceleration rate of the aircraft. Then, once the aircraft has landed, the brakes are automatically applied so as to achieve the desired deceleration rate. Another function implemented by autobraking is RTO (rejected take off). RTO is selected by the pilot while on the ground, and if the aircraft gets above a set speed level, RTO is armed. If throttles are then lowered below takeoff power, autobrake will provide maximum braking of the aircraft. An output of AND gate 62 provides a signal indicative of an auto brake command (e.g., a false output disables autobraking and a true output enables autobraking).

The outputs of AND gate 60 (gear retract braking), AND gate 62 (autobraking) and AND gate 46 (brake pedal signal valid) are provided to respective inputs of OR gate 64. The output of OR gate 64 then is provided to the enable input of the shutoff valve control circuit 50, which controls the flow of power from the shut off vale 22 to the control valves 24 as described above. If the shutoff valve is open, then hydraulic pressure is provided to left and right control valves 24a and 24b. Then, based on a brake command as provided by the brake pedal 10, the left and right control valves 24a and 24b provide brake pressure to left and right brakes (not shown) so as to satisfy the brake command. Similarly, if the EMAC controller is coupled tot he actuator, then electrical power can be provided to the left and right actuator, which in turn provide a brake pressure based on the brake command from the pedal.

Referring in more detail to AND gate 60, four inputs are provided to perform the gear retract brake function. A first input is a gear retract braking enable signal, which may be a request to turn on or off the gear retract braking function (e.g., via a signal from the BSCU 44 or a pilot-operated switch in the cockpit). When this signal is false, gear retract braking is disabled, and when this signal is true, gear retract braking is armed. The second and third inputs to the AND gate 60 are the left hand and right hand throttle quadrant assembly signals. These signals are indicative of an amount of throttle applied to the engines. During takeoff, these signals are true (indicative of full or high throttle conditions encountered during takeoff) and during landing these signals are false (indicative of low throttle conditions during landing). The fourth input to the AND gate 60 is the gear downlock signal, which is inverted (via inverter 60a) prior to being supplied to the AND gate 60. The gear downlock signal is indicative of whether or not the landing gear are locked in the down position. While on the ground or during landing, this signal is true (indicative of the gear being locked in the down position). After takeoff, the landing gear are unlocked and then retracted, and this signal is false.

In operation, if the gear retract braking enable signal is false (e.g. as commanded by the BSCU 44 or set by the pilot), then the output of AND gate 60 will always be false. Thus, gear retract braking is disabled. However, if the gear retract braking enable signal is true, then the AND gate 60 is armed and its output is dependant on the remaining three input signals.

During a takeoff condition, all engines are under full or high throttle, and both LH and RH TQA (throttle quadrant assembly) are set true. However, while the aircraft is on the ground (e.g., accelerating down the runway), gear downlock remains true. Since the gear downlock signal is inverted, the AND gate 60 sees a false while the aircraft is on the ground and thus, gear retract braking cannot occur. Once the aircraft becomes airborne and the landing gear are unlocked, gear downlock becomes false. Since this signal is inverted, the AND gate 60 sees the signal as true and sets its output true, thereby enabling gear retract braking.

Moving now to autobraking, AND gate 62 also includes four inputs for performing autobrake. A first input is an autobrake enable signal, which like the gear retract braking signal of AND gate 62, may be a request to turn on or off the autobraking function (e.g., via a signal from the BSCU 44 or pilot operated switch in the cockpit). When this signal is false, autobraking is disabled, and when this signal is true, autobraking is armed. The second and third inputs to the AND gate 62 are the left hand and right hand throttle quadrant assembly signals, which are inverted (via inverters 62a and 62b) prior to being provided to AND gate 62. As discussed above, these signals are indicative of an amount of throttle applied to the engines (true during takeoff and false during landing). The fourth input to the AND gate 62 is the weight-on-wheels (WOW) input. This signal is indicative of a predetermined weight being detected on the aircraft landing gear (i.e., the aircraft is on the ground). While on the ground this signal is true, and while in the air this signal is false. It is noted that the WOW input and the gear downlock input can be interchanged without significantly affecting the logic.

In operation, if the autobraking function is disabled (e.g., as commanded by the BSCU or set by the pilot), then the autobrake enable input is false and the output of AND gate 62 will always be false. Thus, autobraking is disabled. However, if the pilot has enabled the function (autobrake input is true), then the AND gate 62 is armed and its output is dependant on the remaining three input signals.

During a landing condition, all engines are at partial throttle, and both LH and RH TQA are set false. Since these signals are inverted, the AND gate 62 sees true signals during landing. However, while the aircraft is in the air, the WOW signal remains false, thereby maintaining a false output for AND gate 62. Once the aircraft touches down and sufficient weight is placed on the wheels, the WOW signal becomes true and the output of AND gate 62 switches to true, thereby enabling autobraking.

In some instances, the engines may be placed in a full reverse thrust during landing, which would result in LH and RH TQA being true on landing and disabling autobraking. For such situations, the inputs LH TQA and RH TQA may be substituted with LH and RH TQA pullback (without inverters 62a and 62b), wherein LH and RH TQA pullback is true when the engines are in a full reverse thrust condition.

Figure 4B:
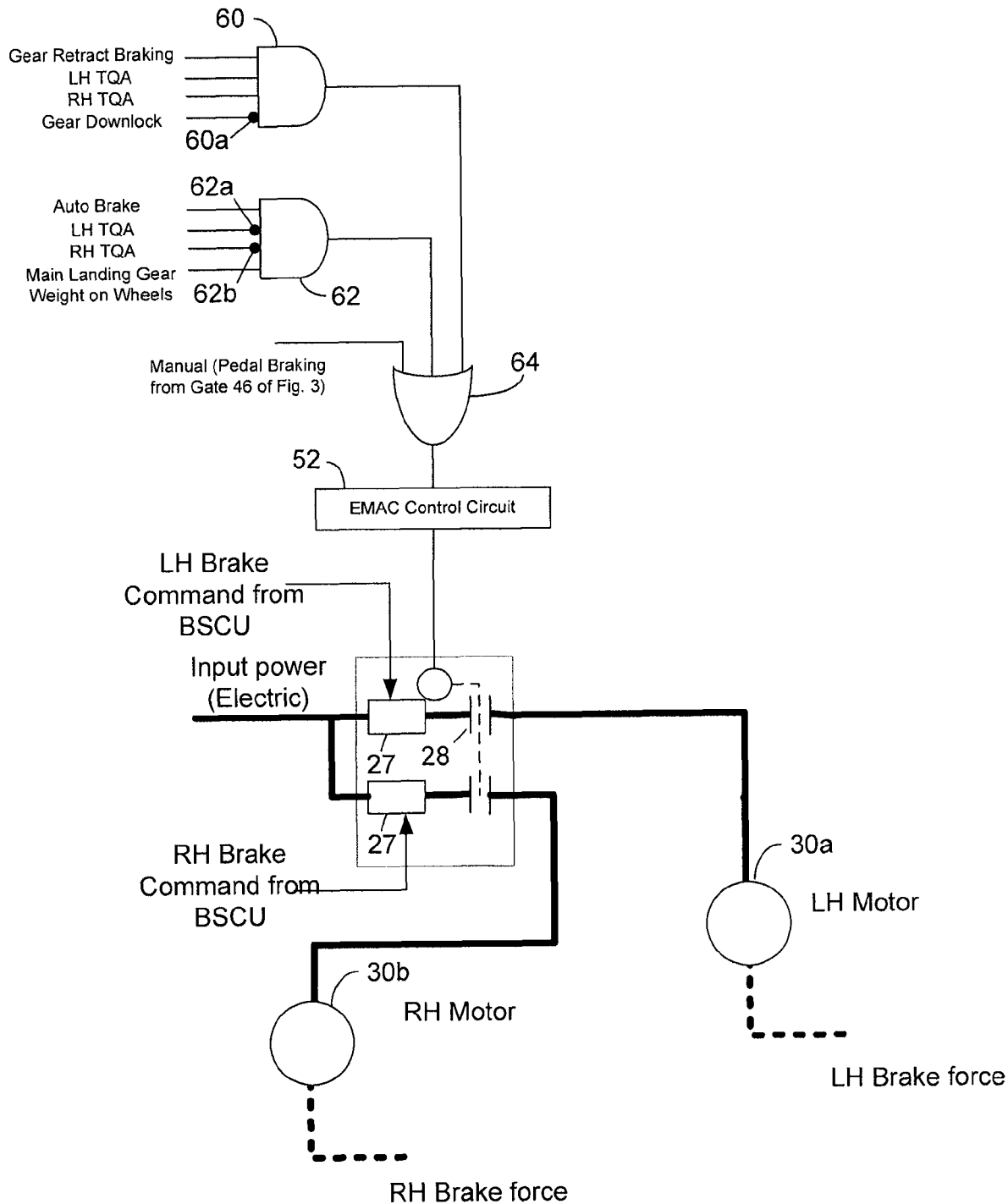
FIG. 4B is a schematic diagram illustrating exemplary logic for enabling or disabling the delivery of an electric braking system in accordance with another embodiment of the invention.

FIG. 4B is the same as FIG. 4A except instead of illustrating a hydraulic brake system, the brake system of FIG. 4B is an electric brake system. Accordingly, operation of the logic for enabling the brake power device shown in FIG. 4B will not be repeated for sake of brevity. It is noted that both FIGS. 4A and 4B are shown for a two-engine aircraft. More or less may be included in the logic depending on the configuration of the aircraft.

The methods described herein may be at least partially implemented in a computer controller (e.g., the BSCU 44), for example, so as to carry out or supplement braking of the vehicle. For example, a computer program may be loaded into memory of the controller and, when executed by the controller, determination of the validity of a braking command as described herein can be executed. Such a controller may be located in the avionics bay of an aircraft, for example, and operatively coupled to the brake actuators on the landing gear and to a brake pedal in the cockpit.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for determining if a brake command is valid, comprising:

deriving, by a brake control circuit, at least two independent signals indicative of brake pedal deflection;

concluding by the brake control circuit, that the brake command is valid in response to the at least two independent signals being within a predetermined range of one another, wherein, in response to the at least two independent signals being within the predetermined range of one another, maintaining that the brake command is invalid until the at least two independent signals are greater than a predetermined value.

2. The method according to claim 1, wherein deriving at least two independent signals includes scaling the signals.

3. The method according to claim 1, further comprising enabling a power delivery device in response to the brake command being valid, and disabling the power deliver device in response to the brake command being invalid.

4. The method according to claim 1, further comprising electrically isolating the at least two independent signals from one another.

* * * * *